United States Patent Office 3,642,767
Patented Feb. 15, 1972

3,642,767
WATER-INSOLUBLE DISPERSE MONOAZO DYES
Erwin Hahn, Viernheim, and Hans Guenter Wippel, Ludwigshafen (Rhine), Germany, assignors to Badische Anilin- & Soda-Fabrik Aktiengesellschaft, Ludwigshafen (Rhine), Germany
No Drawing. Filed Sept. 16, 1968, Ser. No. 762,317
Claims priority, application Germany, Sept. 20, 1967, P 16 44 069.0
Int. Cl. C09b 29/00, 29/08; D06p 1/04
U.S. Cl. 260—158    2 Claims

ABSTRACT OF THE DISCLOSURE

Water-insoluble disperse monoazo dyes having an aromatic or heterocyclic diazo component and a para-aminophenyl coupling component in which the amino nitrogen atom is substituted by phenylethyl and by an ethyl or propyl group substituted by hydroxy, methoxy, ethoxy, acetoxy or propionyloxy groups. These dispersion dyes are useful as applied to hydrophobic fibers, especially polyester fibers such as polyethylene terephthalate and exhibit good fastness to light, wetting and the effect of high temperatures.

This invention relates to water-insoluble monoazo dyes having the general Formula I:

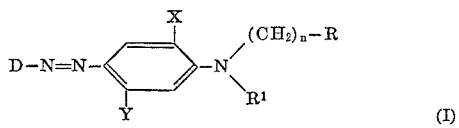

(I)

in which D denotes the radical of an aromatic or heterocyclic diazo component, X denotes a hydrogen atom or a low molecular weight alkyl or alkoxy group, Y denotes a hydrogen, chlorine or bromine atom or a low molecular alkyl, alkoxy or acylamino group, R denotes an unsubstituted or substituted phenyl radical, $R^1$ denotes a hydroxyalkyl, acyloxyalkyl or alkoxyalkyl radical and $n$ denotes one of the integers 1 and 2.

In addition to the specific substituents for X and Y already mentioned, the following are further examples: methyl, ethyl, methoxy or ethoxy for X and methyl, methoxy, acetylamino or propionylamino for Y.

Examples of substituents for the phenyl radical R are chlorine atoms or bromine atoms or alkyl groups having one to four carbon atoms or alkoxy groups having one or two carbon atoms.

The radicals $R^1$ may contain one or more hydroxy, alkoxy or acyloxy groups and the groups may be combined together.

Dyes which are particularly valuable industrially have the following general formula:

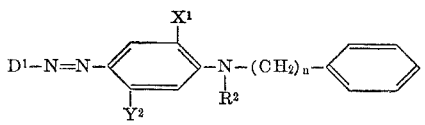

in which $D^1$ denotes the radical of an aniline derivative bearing halogen atoms or nitro, alkylsulfonyl, cyano, carboxylic ester, alkoxy, trifluoromethyl, alkyl or acylamino groups as substituents or the radical of a thiazole, thiadiazole or benzothiazole, $X^1$ denotes a hydrogen atom or a methoxy or ethoxy group, $Y^1$ denotes a hydrogen, chlorine or bromine atom or a methyl, ethyl, acetylamino or propionylamino group, $R^2$ denotes a β-hydroxyethyl, β-hydroxypropyl, β,γ - dihydroxypropyl, β - hydroxyl-γ-chloropropyl, β - methoxyethyl, β - ethoxyethyl, β - hydroxy - γ - methoxypropyl, β-acetoxyethyl, β - propionyl-oxyethyl, β - acetoxypropyl or β,γ - diacetoxypropyl group and $n$ denotes one of the integers 1 and 2.

Dyes according to the invention are eminently suitable, particularly in finely divided form, for dyeing textile material of acetylcellulose such as secondary cellulose acetate or cellulose triacetate, polyamides such as nylon 6 or nylon 6.6 and particularly linear polyester such as polyethylene glycol terephthalate. The dyeings obtained are distinguished by good wet and light fastness and also very good resistance to high temperatures.

The carrier method and preferably the HT-method are suitable as dyeing methods.

The new dyes are obtained for example by reacting a diazo compound of an amine having the general Formula II:

$$D—NH_2 \qquad (II)$$

with a coupling component having the general Formula III:

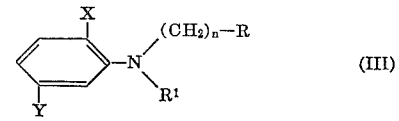

(III)

D, X, Y, R, $R^1$ and $n$ having the meanings given above.

Particularly diazotisable aminobenzenes, for example aniline and its derivatives which bear nonionic substitutents such as halogen atoms, nitro, alkyl, cyano, acylamino, alkylsulfonyl, trifluoromethyl, alkoxy or carbalkoxy groups are suitable as amines having the Formula II for the production of the new dyes. The following are specific examples:

1-amino-4-methylbenzene,
1-amino-4-chlorobenzene,
1-amino-4-bromobenzene,
1-amino-4-nitrobenzene,
1-amino-2-cyano-4-nitrobenzene,
1-amino-4-cyanobenzene,
1-amino-2-chloro-4-nitrobenzene,
1-amino-4-carbomethoxybenzene,
1-amino-2-carbomethoxy-4-nitro-6-chlorobenzene,
1-amino-2-carbomethoxy-4-nitro-6-bromobenzene,
1-amino-2-bromo-4-carbomethoxybenzene,
1-amino-2-trifluoromethyl-4-nitrobenzene,
1-amino-2-methyl-4-nitrobenzene,
1-amino-2,4-dichlorobenzene,
1-amino-2-methyl-4-chlorobenzene,
1-amino-2,6-dibromo-4-methylsufonylbenzene,
1-amino-2,6-dichloro-4-nitrobenzene,
1-amino-2,4-dinitro-6-bromobenzene,
1-amino-4-acetylaminobenzene,
1-amino-2,4-dinitro-6-chlorobenzene,
1-amino-2,4-dinitrobenzene,
1-amino-2-trifluoromethyl-4-chlorobenzene,
1-amino-2,6-dibromo-4-nitrobenzene,
1-amino-2,4-bis-(methylsulfonyl)-benzene,
1-amino-4-cyano-2-methylsulfonylbenzene,
1-amino-2-methylsulfonyl-4-nitrobenzene,
1-amino-2-methylsulfonyl-4-nitro-6-chlorobenzene,
1-amino-2-methylsulfonyl-4-nitro-6-bromobenzene,
1-amino-2-cyano-4-methylsulfonylbenzene,
1-amino-2,4-dicyanobenzene,
1-amino-2-cyano-4-chlorobenzene,
1-amino-2-chloro-4-cyanobenzene,
1-amino-2-chloro-4-nitrobenzene,
1-amino-2-chloro-4-methylsulfonylbenzene,
1-amino-4-chloro-2-methylsulfonylbenzene,
1-amino-2-methoxy-4-nitrobenzene, and
1-amino-2-methoxy-4-nitro-6-bromobenzene.

Examples of diazotisable heterocyclic amines $D—NH_2$ are: 2-aminothiazole, 2-aminobenzothiazole, aminothiadiazoles and their derivatives bearing nonionic groups as substituents, such as 2-amino-5-nitrothiazole,
2-amino-6-methoxybenzothiazole,
2-amino-6-carbomethoxybenzothiazole,
2-amino-6-methylsulfonylbenzothiazole,
2-amino-6-nitrobenzothiazole,
2-amino-5-phenylthiadiazole-(1,3,4),
3-methylmercapto-5-aminothiadiazole-(1,2,4),
3-(β-carbomethoxyethylmercapto)-5-aminothiadiazole-(1,2,4) or
3-(β-carboethoxyethylmercapto)-5-aminothiadiazole-(1,2,4).

Examples of coupling components corresponding to the general Formula III are:

N-benzyl-N-β-hydroxyethylaniline,
N-β-phenylethyl-N-β-hydroxyethylaniline,
N-benzyl-N-β-hydroxypropylaniline,
N-β-phenylethyl-N-β-hydroxypropylaniline,
N-benzyl-N,β-γ-dihydroxypropylaniline,
N-phenylethyl-N,β,γ-dihydroxypropylaniline,
N-benzyl-N-β-hydroxy-γ-chloropropylaniline,
N-benzyl-N-β-methoxyethylaniline,
N-β-phenylethyl-N-β-methoxyethylaniline,
N-benzyl-N-β-methoxypropylaniline,
N-phenylethyl-N-β-methoxypropylaniline,
N-benzyl-N-β-hydroxy-γ-methoxypropylaniline,
N-benzyl-N-β-ethoxyethylaniline,
N-benzyl-N-β-acetoxyethylaniline,
N-phenylethyl-N-β-acetoxyethylaniline,
N-benzyl-N-β-acetoxypropylaniline,
N-phenylethyl-N-β-acetoxypropylaniline,
N-benzyl-N-β-propionyloxyethylaniline,
N-benzyl-N-β-acetoxy-γ-methoxypropylaniline and the corresponding anilines bearing methyl or chlorine as substituents in meta-position or N-benzyl-N-β-hydroxyethyl-3-acetylaminoaniline,
N-benzyl-N-β-hydroxyethyl-3-propionylaminoaniline,
N-benzyl-N-β-methoxyethyl-3-acetylaminoaniline,
N-benzyl-N-β-acetoxyethyl-3-acetylaminoaniline,
N-benzyl-N-β-hydroxyethyl-3-acetylamino-6-methoxyaniline,
N-benzyl-N-β-hydroxyethyl-3-acetylamino-6-ethoxyaniline,
N-benzyl-N-β-acetoxyethyl-3-acetylamino-6-methoxyaniline or
N-benzyl-N-β-γ-dihydroxypropyl-3-acetylamino-6-methoxyaniline.

The invention is illustrated by the following examples. Statements as regards parts and percentages in the following examples relate to weight.

EXAMPLE 1

A mixture of 13.8 parts of 1-amino-4-nitrobenzene, 100 parts of water and 30 parts of concentrated hydrochloric is stirred for one hour while stirring, 200 parts of ice is added and then at 0° to 5° C. a solution of 6.1 parts of sodium nitrite in 20 parts of water is allowed to flow in. The whole is stirred for an hour, any excess of nitrite present is removed by adding 0.5 part of sulphamic acid and the diazo solution is filtered. The filtrate is added gradually to a solution of 22.7 parts of N-benzyl-N-β-hydroxyethylaniline in 500 parts of acetone, 20 parts of concentrated hydrochloric acid and 150 parts of ice. The whole is stirred for another thirty minutes, another 300 parts of ice is added, the reaction mixture is neutralized with a solution of 42 parts of sodium acetate in 200 parts of water and stirred for another sixteen hours. The dye, deposited in crystalline form, is suction filtered, washed with water until neutral and dried at 50° C. at subatmospheric pressure. It has the formula

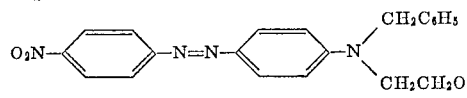

and dyes polyethylene glycol terephthalate bright red shades having good fastness properties.

If the diazo components and coupling components set out in the following table are used instead of the components in Example 1, dyes having similar good properties are obtained. In all the following tables E= Example No. and Shade=shade of the dyeing on polyester.

| E | Diazo component | Coupling component | Shade |
|---|---|---|---|
| 2 | $O_2N$—⟨ ⟩(Cl)—$NH_2$ | ⟨ ⟩—N(CH$_2$—C$_6$H$_5$)(C$_2$H$_4$OC(=O)CH$_3$), HNCOCH$_3$ | Claret. |
| 3 | $O_2N$—⟨ ⟩(OCH$_3$)—$NH_2$ | ⟨ ⟩—N(C$_2$H$_4$—C$_6$H$_5$)(C$_2$H$_4$OH) | Red. |
| 4 | $O_2N$—⟨ ⟩(CF$_3$)—$NH_2$ | ⟨ ⟩—N(C$_2$H$_4$—C$_6$H$_5$)(C$_2$H$_4$OC(=O)CH$_3$) | Scarlet. |
| 5 | ⟨ ⟩(CO$_2$CH$_3$)(CO$_2$CH$_3$)—NH$_2$ | Same as above | Orange. |
| 6 | C$_2$H$_5$OC(=O)—⟨ ⟩—NH$_2$ | ⟨ ⟩—N(CH$_2$—C$_6$H$_5$)(C$_2$H$_4$OC(=O)CH$_3$) | Yellow orange. |

EXAMPLE 7

12 parts of 1-amino-4-nitrobenzene-2-methylsulfone is introduced at 0° to 5° C. while stirring into a mixture of 14.5 parts of nitrosylsulfuric acid having a content of 13.1% of dinitrogen trioxide and 55 parts of 85% sulfuric acid and the whole is stirred for four hours. A solution of 11.35 parts of N-benzyl-N-β-hydroxyethylaniline and 50 parts of glacial acetic acid is allowed to flow gradually into the diazo solution at 0° to 5° C., the whole is stirred for thirty minutes and the reaction mixture is poured onto ice. Following stirring for two hours the dye which has been deposited in crystalline form is suction filtered, washed with water until neutral and dried under subatmospheric pressure at 50° C. It dyes polyethylene glycol terephthalate ruby shades having excellent resistance to high temperatures.

Similar dyes are obtained with the components given in the following table:

| E | Diazo component | Coupling component | Shade |
|---|---|---|---|
| 8 | $O_2N$—⟨CN, $NH_2$⟩ | Ph—N($C_2H_4C_6H_5$)($CH_2$—CH(OH)—$CH_2OH$) | Ruby. |
| 9 | $O_2N$—⟨CN, $NH_2$, Br⟩ | Ph(Cl)—N($C_2H_4C_6H_5$)($CH_2$—$CH_2OH$, CH) | Claret. |
| 10 | $O_2N$—⟨$SO_2CH_3$, $NH_2$, Cl⟩ | Ph($CH_3$)—N($C_2H_4C_6H_5$)($CH_2$—CH(OH)—$CH_2OH$) | Do. |
| 11 | $O_2N$—⟨Br, $NH_2$, Br⟩ | Ph(Cl)—N($C_2H_4C_6H_5$)($C_2H_4OH$) | Yellow brown. |
| 12 | $O_2N$—⟨$NO_2$, $NH_2$, Br⟩ | Ph($CH_3$)—N($C_2H_4C_6H_5$)($C_2H_4OH$) | Violet. |
| 13 | $O_2N$—⟨Cl, $NH_2$, Br⟩ | Ph(Cl)—N($C_2H_4C_6H_5$)($C_2H_4OC(O)CH_3$) | Yellow brown. |
| 14 | $O_2N$—⟨$CO_2CH_3$, $NH_2$, Br⟩ | Ph($CH_3$)—N($C_2H_4C_6H_5$)($C_2H_4OC(O)CH_3$) | Red brown. |
| 15 | $C_2H_5O$—C(O)—⟨Br, $NH_2$⟩ | Ph(Cl)—N($C_2H_4C_6H_5$)($C_2H_4OH$) | Orange red. |
| 16 | $O_2N$—⟨$SO_2CH_3$, $NH_2$, $NO_2$⟩ | Ph($CH_3$)—N($C_2H_4C_6H_5$)($C_2H_4OH$) | Violet blue. |
| 17 | $O_2N$—⟨$SO_2CH_3$, $NH_2$, Br⟩ | Ph—N($CH_2C_6H_5$)($CH_2$—CH(OH)—$CH_2OH$) | Red brown. |
| 18 | $C_2H_5O$—C(O)—⟨Br, $NH_2$, Br⟩ | Ph—N($CH_2C_6H_5$)($C_2H_4OCH_3$) | Orange. |
| 19 | $O_2N$—⟨$OCH_3$, $NH_2$, Br⟩ | Ph(HNCOCH$_3$)—N($C_2H_4OH$)($CH_2C_6H_5$) | Ruby. |

EXAMPLE 20

50 parts of a mixture of anhydrous acetic acid and propionic acid in the ratio 17:3 is allowed to flow at 0° to 5° C. into a mixture of 14.5 parts of nitrosylsulfuric acid having a content of 13.1% of dinitrogen trioxide and 15 parts of concentrated sulfuric acid and then 7.25 parts of 2-amino-5-nitro-1,3-thiazole is added to this mixture at 0° to 5° C. Another 50 parts of the said mixture of acetic acid and propionic acid is added and, after the whole has been stirred for three hours, 2 parts of urea is added at 0° to 5° C. The clear solution obtained is allowed to flow gradually at 0° to 5° C. into a solution of 11.35 parts of N-benzyl-N-β-hydroxyethylaniline in 250 parts of acetone, 10 parts of concentrated hydrochloric acid and 75 parts of ice, the whole is stirred for thirty minutes, 100 parts of ice-water is added and stirring is continued for another sixteen hours. The dye which has been deposited in crystalline form is suction filtered, washed with water until neutral and dried at 50° C. at subatmospheric pressure. It dyes polyethylene glycol terephthalate cloth blue violet shades having very good thermal fastness properties.

EXAMPLE 21

50 parts of phosphoric acid is allowed to flow at 0° to 5° C. into a mixture of 14.5 parts of nitrosylsulfuric acid having a content of 13.1% of dinitrogen trioxide and 15 parts of concentrated sulfuric acid. Then 8.85 parts of 2-amino-5-phenyl-1,3,4-thiadiazole is added to the mixture. Three hours later 2 parts of urea is added at 0° to 5° C. while stirring. The resultant diazo solution is allowed to flow gradually at 0° to 5° C. into a solution of 14.2 parts of N-benzyl-N-β-hydroxyethyl - 3 - acetylaminoaniline in 250 parts of acetone, 10 parts of concentrated hydrochloric acid and 75 parts of ice. After the whole has been stirred for thirty minutes, 1000 parts of ice-water is added and stirring is continued for sixteen hours. The dye which is deposited in crystalline form is suction filtered, washed with water until neutral and dried at 50° C. at subatmospheric pressure. It has the formula

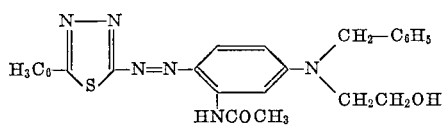

and dyes polyethylene glycol terephthalate fibers red shades having excellent thermal fastness properties.

EXAMPLE 22

50 parts of a mixture of anhydrous acetic acid and propionic acid in the ratio 17:3 is allowed to flow gradually at 0° to 5° C. into a mixture of 14.5 parts of nitrosylsulfuric acid having a content of 13.1% of dinitrogen trioxide and 15 parts of concentrated sulfuric acid and then 7.35 parts of 3-methylmercapto-5-aminothiadiazole-(1,2,4) and another 50 parts of the said mixture of acetic acid and propionic acid are added followed, after the whole has been stirred for three hours at 0° to 5° C., by 2 parts of urea. The reaction mixture obtained is allowed to flow gradually at 0° to 5° C. into a solution of 13.8 parts of N-β-phenylethyl-N-β-hydroxyethyl-3-chloroaniline in 250 parts of acetone, 10 parts of concentrated hydrochloric acid and 75 parts of ice. Thirty minutes later 1000 parts of ice-water is added and the whole is stirred for another sixteen hours. The dye is suction filtered, washed with water until neutral and dried at 50° C. at subatmospheric pressure. It has the formula

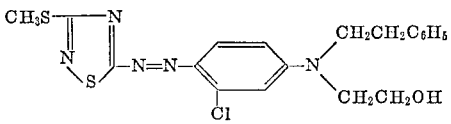

and gives scarlet shades having outstanding brilliance and generally good fastness properties on polyethylene glycol terephthalate cloth.

EXAMPLE 23

60 parts of a mixture of anhydrous acetic acid and propionic acid in the ratio of 17:3 is allowed to flow at 0° to 5° C. into a mixture of 18.5 parts of nitrosylsulfuric acid having a content of 12.9% of dinitrogen trioxide and 20 parts of concentrated sulfuric acid and then there is added to this mixture at 0° to 5° C. 13.75 parts of 2-amino-6-carboethoxybenzothiazole. Another 60 parts of the said mixture of acetic acid and propionic acid is then added, the whole is stirred for another four hours at 0° to 5° C. and then 2 parts of urea is added. The diazo solution obtained is then allowed to flow gradually into a solution of 14.6 parts of 2-methoxy-5-acetylamino-N-β-hydroxyethyl-N-benzylaniline in 250 parts of acetone, 10 parts of concentrated hydrochloric acid and 75 parts of ice, the whole is stirred for thirty minutes and 1000 parts of ice-water is added. The dye which is deposited in crystalline form is suction filtered after stirring for sixteen hours, washed with water until neutral and dried at 50° C. at subatmospheric pressure. It dyes polyethylene glycol terephthalate fibers claret shades.

EXAMPLE 24

The dye having the formula:

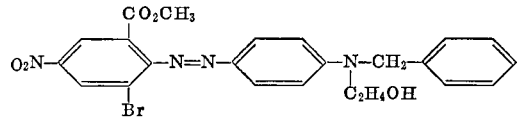

which dyes secondary cellulose acetate red brown shades having excellent fastness to light and gas fume fading is obtained by a method analogous to that in Example 7 from 2-carbomethoxy-4-nitro - 6 - bromoaniline and N-benzyl-N-β-hydroxyethylaniline.

Dyes which dye polyester in the shades indicated are obtained from the components given in the following table:

| E | Diazo component | Coupling component | Shade |
|---|---|---|---|
| 25 | O₂N—⟨ ⟩—NH₂ | ⟨ ⟩—N(C₂H₄OH)(C₂H₄—C₆H₅), CH₃ | Dark red. |
| 26 | Same as above | ⟨ ⟩—N(C₂H₄OC(O)—CH₃)(C₂H₄—C₆H₅), CH₃ | Red. |
| 27 | ...do... | ⟨ ⟩—N(C₂H₄OH)(C₂H₄—C₆H₅) | Red. |

TABLE—Continued

| E | Diazo component | Coupling component | Shade |
|---|---|---|---|
| 28 | $O_2N$—C₆H₄—$NH_2$ (para) | C₆H₅—N(C₂H₄OC(O)CH₃)(CH₂—C₆H₅) | Scarlet. |
| 29 | Same as above | C₆H₅—N(CH₂—CH(OH)—CH₂OH)(CH₂—C₆H₅) | Orange. |
| 30 | do | 3-Cl-C₆H₄—N(C₂H₄OH)(C₂H₄—C₆H₅) | Red. |
| 31 | do | 3-Cl-C₆H₄—N(CH₂—CH(OH)—CH₂OH)(C₂H₄—C₆H₅) | Scarlet. |
| 32 | 2-Cl-4-$O_2N$-C₆H₃—$NH_2$ | C₆H₅—N(C₂H₄OH)(CH₂—C₆H₅) | Dark red. |
| 33 | Same as above | 3-CH₃-C₆H₄—N(C₂H₄OH)(C₂H₄—C₆H₅) | Do. |
| 34 | do | 3-CH₃-C₆H₄—N(C₂H₄OC(O)CH₃)(C₂H₄—C₆H₅) | Red. |
| 35 | do | C₆H₅—N(C₂H₄OH)(C₂H₄—C₆H₅) | Dark red. |
| 36 | do | C₆H₅—N(C₂H₄OC(O)CH₃)(CH₂—C₆H₅) | Red. |
| 37 | do | 3-Cl-C₆H₄—N(C₂H₄OH)(C₂H₄—C₆H₅) | Dark red. |
| 38 | 2-$SO_2CH_3$-4-$O_2N$-C₆H₃—$NH_2$ | 3-CH₃-C₆H₄—N(C₂H₄OH)(C₂H₄—C₆H₅) | Red violet. |
| 39 | Same as above | 3-CH₃-C₆H₄—N(C₂H₄OC(O)CH₃)(C₂H₄—C₆H₅) | Ruby. |
| 40 | do | 3-Cl-C₆H₄—N(C₂H₄OH)(C₂H₄—C₆H₅) | Rose. |
| 41 | do | C₆H₅—N(C₂H₄OC(O)CH₃)(C₂H₄—C₆H₅) | Red. |

TABLE—Continued

| E | Diazo component | Coupling component | Shade |
|---|---|---|---|
| 42 | 2-amino-4-nitro-benzonitrile ($O_2N$—C₆H₃(CN)—$NH_2$) | N-phenyl with $C_2H_4OH$ and $CH_2$—$C_6H_5$ | Ruby. |
| 43 | Same as above | N-phenyl with $C_2H_4OC(=O)CH_3$ and $CH_2$—$C_6H_5$ | Dark red. |
| 44 | do | N-(m-methylphenyl) with $C_2H_4OH$ and $C_2H_4$—$C_6H_5$ | Red violet. |
| 45 | do | N-(m-methylphenyl) with $C_2H_4OC(=O)CH_3$ and $C_2H_4$—$C_6H_5$ | Ruby. |
| 46 | do | N-(m-chlorophenyl) with $C_2H_4OH$ and $C_2H_4$—$C_6H_5$ | Dark red. |
| 47 | do | N-phenyl with $C_2H_4OC(=O)CH_3$ and $C_2H_4$—$C_6H_5$ | Do. |
| 48 | do | N-phenyl with $C_2H_4OH$ and $C_2H_4$—$C_6H_5$ | Ruby. |
| 49 | 2-amino-3-bromo-5-nitro-chlorobenzene (Br, $O_2N$, Cl, $NH_2$ substituted benzene) | N-phenyl with $C_2H_4OC(=O)CH_3$ and $CH_2$—$C_6H_5$ | Yellow brown. |
| 50 | Same as above | N-(m-methylphenyl) with $C_2H_4OH$ and $C_2H_4$—$C_6H_5$ | Brown red. |
| 51 | do | N-(m-methylphenyl) with $C_2H_4OC(=O)CH_3$ and $C_2H_4$—$C_6H_5$ | Red brown. |
| 52 | do | N-(m-chlorophenyl) with $C_2H_4OCH_3$ and $C_2H_4$—$C_6H_5$ | Yellow brown. |
| 53 | methyl 2-amino-3-bromo-5-nitrobenzoate ($CO_2CH_3$, $O_2N$, Br, $NH_2$ substituted benzene) | N-phenyl with $C_2H_4OH$ and $C_2H_4$—$C_6H_5$ | Red brown. |
| 54 | Same as above | N-phenyl with $C_2H_4OC(=O)CH_3$ and $CH_2C_6H_5$ | Brown red. |
| 55 | do | N-(m-methylphenyl) with $C_2H_4OH$ and $C_2H_4$—$C_6H_5$ | Ruby. |

TABLE—Continued

| E | Diazo component | Coupling component | Shade |
|---|---|---|---|
| 56 | 2-amino-4-nitro-6-bromo-benzoic acid methyl ester (O₂N—, CO₂CH₃, NH₂, Br on benzene) | N-phenyl(CH₃)-N(C₂H₄OC(O)CH₃)(C₂H₄—C₆H₅) | Dark red. |
| 57 | 2-amino-5-nitrothiazole | N-(3-methylphenyl)-N(C₂H₄OH)(C₂H₄—C₆H₅) | Blue. |
| 58 | Same as above | N-(3-methylphenyl)-N(C₂H₄OC(O)CH₃)(CH₂—C₆H₅) | Blue violet. |
| 59 | do | N-phenyl-N(C₂H₄OC(O)CH₃)(CH₂—C₆H₅) | Violet. |
| 60 | do | N-phenyl-N(CH₂—CH(OH)—CH₂OH)(C₂H₄—C₆H₅) | Blue violet. |
| 61 | do | N-(3-chlorophenyl)-N(C₂H₄OH)(C₂H₄—C₆H₅) | Violet. |
| 62 | do | N-phenyl-N(C₂H₄OC(O)CH₃)(C₂H₄—C₆H₅) | Do. |
| 63 | do | N-(3-acetamidophenyl)-N(CH₂—C₆H₅)(C₂H₄OH) | Blue. |
| 64 | 2-amino-5-phenyl-1,3,4-thiadiazole | N-phenyl-N(C₂H₄OH)(C₂H₄—C₆H₅) | Scarlet. |
| 65 | Same as above | N-phenyl-N(C₂H₄OC(O)CH₃)(CH₂—C₆H₅) | Red. |
| 66 | do | N-phenyl-N(CH₂—CH(OH)—CH₂OH)(C₂H₄—C₆H₅) | Salmon. |
| 67 | do | N-(3-methylphenyl)-N(C₂H₄OH)(C₂H₄—C₆H₅) | Red. |
| 68 | do | N-(3-methylphenyl)-N(C₂H₄OC(O)CH₃)(C₂H₄—C₆H₅) | Scarlet. |
| 69 | do | N-phenyl-N(C₂H₄OC(O)CH₃)(C₂H₄—C₆H₅) | Orange. |

TABLE—Continued

| E | Diazo component | Coupling component | Shade |
|---|---|---|---|
| 70 | CH₃O—C(=O)—C₂H₄—S— [1,3,4-thiadiazole-2-NH₂ at 5-position] | C₆H₅—N(C₂H₄OH)(CH₂—C₆H₅) | Red. |
| 71 | CH₃O—C(=O)—C₂H₄—S— [1,3,4-thiadiazole-2-NH₂ at 5-position] | C₆H₅—N(C₂H₄OC(=O)CH₃)(C₂H₄—C₆H₅) | Scarlet. |
| 72 | Same as above | 4-Cl—C₆H₄—N(C₂H₄OH)(C₂H₄—C₆H₅) | Red₂ |
| 73 | CH₃S— [1,3,4-thiadiazole-2-NH₂ at 5-position] | 4-Cl—C₆H₄—N(C₂H₄OH)(C₂H₄—C₆H₅) | Dark red₂ |
| 74 | Same as above | C₆H₅—N(C₂H₄OH)(CH₂—C₆H₅) | Red₂ |
| 75 | do | C₆H₅—N(C₂H₄OC(=O)CH₃)(C₂H₄—C₆H₅) | Scarlet₂ |
| 76 | do | C₆H₅—N(C₂H₄—C₆H₅)(CH₂—CH(OH)—CH₂OH) | Rose. |
| 77 | do | 3-CH₃—C₆H₄—N(C₂H₄OH)(C₂H₄—C₆H₅) | Dark red₂ |
| 78 | do | 3-CH₃—C₆H₄—N(C₂H₄OC(=O)CH₃)(C₂H₄—C₆H₅) | Red₂ |
| 79 | C₂H₅O—C(=O)— [6-substituted benzothiazol-2-NH₂] | C₆H₅—N(C₂H₄OH)(CH₂—C₆H₅) | Dark red. |
| 80 | Same as above | C₆H₅—N(C₂H₄OC(=O)CH₃)(CH₂—C₆H₅) | Red₂ |
| 81 | do | C₆H₅—N(CH₂CH(OH)—CH₂OH)(C₂H₄—C₆H₅) | Dark red. |
| 82 | do | 3-Cl—C₆H₄—N(C₂H₄OH)(C₂H₄—C₆H₅) | Rose. |
| 83 | do | 3-CH₃—C₆H₄—N(C₂H₄OH)(C₂H₄—C₆H₅) | Ruby. |

TABLE—Continued

| E | Diazo component | Coupling component | Shade |
|---|---|---|---|
| 84 | $C_2H_5O-\overset{O}{\underset{\|}{C}}-\underset{N}{\overset{S}{\diagup}}-NH_2$ (benzothiazole) | phenyl-N($C_2H_4O\overset{O}{\underset{\|}{C}}-CH_3$)($C_2H_4-C_6H_5$), meta-$CH_3$ | Red. |
| 85 | Same as above | phenyl-N($C_2H_4OH$)($C_2H_4-C_6H_5$) | Dark red. |
| 86 | do | phenyl-N($C_2H_4O\overset{O}{\underset{\|}{C}}-CH_3$)($C_2H_4-C_6H_5$) | Red. |
| 87 | 4-$O_2N$-, 2-$SO_2CH_3$-, 6-Cl-aniline ($NH_2$) | phenyl-N($CH_2-C_6H_5$)($C_2H_4OH$) | |
| 88 | 4-$O_2N$-, 2-CN-aniline ($NH_2$) | phenyl-N($CH_2-CHOH-CH_2OH$)($C_2H_4-C_6H_5$), meta-Cl | |

We claim:
1. A monoazo dye having the formula

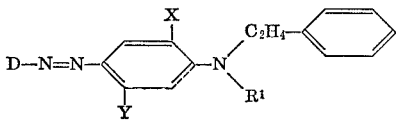

in which
D is a diazotized heterocyclic radical selected from the class consisting of
2-amino-5-nitrothiazole,
2-aminobenzthiazole,
2-amino-6-methoxy-benzthiazole,
2-amino-6-methylsulfonyl-benzthiazole,
2-amino-6-carbomethoxybenzthiazole,
2-amino-5-phenylthiadiazole-(1,3,4),
3-methyl-mercapto-5-aminothiadiazole-(1,2,4),
3-(β-carbomethoxyethylmercapto)-5-aminothiadiazole-(1,2,4), and
3-(β-carboethoxyethylmercapto)-5-amino-thiadiazole-(1,2,4);
X is hydrogen, methyl or methoxy;
Y is hydrogen, chlorine, bromine, methyl, methoxy, acetylamino or propionylamino; and
$R^1$ is
β-hydroxyethyl,
β-hydroxypropyl,
β,γ-dihydroxypropyl,
β-hydroxy-γ-chloropropyl,
β-methoxyethyl,
β-ethoxyethyl,
β-hydroxy-γ-methoxypropyl,
β-acetoxyethyl,
β-propionyloxyethyl,
β-acetoxypropyl or
β,γ-diacetoxypropyl.

2. A monoazo dye having the formula

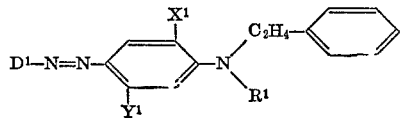

in which
$D^1$ is a diazotized radical selected from the class consisting of
3-methyl-mercapto-5-amino-thiadiazole-(1,2,4),
3-(β-carbomethoxyethylmercapto)-5-amino-thiadiazole-(1,2,4) and
3-(β-carboethoxyethylmercapto)-5-amino-thiadiazole-(1,2,4);
$X^1$ is hydrogen or methoxy;
$Y^1$ is hydrogen, chlorine, methyl, acetylamino or propionylamino; and
$R^1$ is
β-hydroxyethyl,
β-hydroxypropyl,
β,γ-dihydroxypropyl,
β-hydroxy-γ-chloropropyl,
β-methoxyethyl,
β-ethoxyethyl,
β-hydroxy-γ-methoxypropyl,
β-acetoxyethyl,
β-propionyloxyethyl,
β-acetoxypropyl or
β,γ-diacetoxypropyl.

References Cited

UNITED STATES PATENTS

| 2,117,733 | 5/1938 | Krzikalla et al. | 260—205 |
| 2,249,749 | 7/1941 | Dickey et al. | 260—152 |
| 2,889,315 | 6/1959 | Bossard et al. | 260—158 X |
| 3,097,198 | 7/1963 | Fishwick et al. | 260—207.1 |
| 3,101,988 | 8/1963 | Bossard et al. | 260—158 X |
| 3,132,132 | 5/1964 | Suzuki et al. | 260—158 |
| 3,483,180 | 12/1969 | Ramanathan | 260—158 |

FLOYD D. HIGEL, Primary Examiner

U.S. Cl. X.R.

8—4, 41 B, 50; 117—138.8 R, 144; 260—37 N, 205, 206, 207, 207.1, 302 R, 302 D, 305, 465 E, 471 R, 490, 518 R, 570.5 R, 575, 578

PO-1050
(5/69)

UNITED STATES PATENT OFFICE
CERTIFICATE OF CORRECTION

Patent No. 3,642,767　　　　　Dated February 15, 1972

Inventor(s) Erwin Hahn and Hans Guenter Wippel

It is certified that error appears in the above-identified patent and that said Letters Patent are hereby corrected as shown below:

Column 1, line 61, that portion of the formula reading "$Y^2$" should read -- $Y^1$ --.

Column 2, line 7, "6.6" should read -- 6,6 --; line 28, "tatents" should read -- tuents --.

Column 6, in the table, Example 9, under "Coupling component", that portion of the formula reading "$CH_2OH$" should read $$-- \underset{\underset{OH}{\|}}{C}H-CH_2OH \; -- \;.$$
(with CH above)

Column 8, line 25, "12.9%" should read -- 12.8% --.

Column 15, in the table, Example 71, under "Diazo component", that portion of the formula reading "$CH_3O-C-C_8H_4$" should read $$-- \; CH_3O-\underset{\underset{O}{\|}}{C}-C_2H_4 \; --\;.$$

Signed and sealed this 29th day of August 1972.

(SEAL)
Attest:

EDWARD M. FLETCHER, JR.
Attesting Officer

ROBERT GOTTSCHALK
Commissioner of Patents